United States Patent [19]

Maccabee

[11] Patent Number: 5,646,907
[45] Date of Patent: Jul. 8, 1997

[54] METHOD AND SYSTEM FOR DETECTING OBJECTS AT OR BELOW THE WATER'S SURFACE

[75] Inventor: Bruce S. Maccabee, Sabillasville, Md.

[73] Assignee: The United States of America as represented by the Secretary of the Navy, Washington, D.C.

[21] Appl. No.: 514,464

[22] Filed: Aug. 9, 1995

[51] Int. Cl.⁶ ................................................. G01S 15/00
[52] U.S. Cl. ........................... 367/93; 367/94; 367/128; 250/492.1
[58] Field of Search ........................... 367/93, 94, 909, 367/128, 7–10, 140, 141; 250/492.1; 73/801; 356/432, 432 T, 850; 340/555–557, 565–567

[56] References Cited

U.S. PATENT DOCUMENTS

| | | | |
|---|---|---|---|
| H1231 | 9/1993 | Richards | 340/850 |
| 3,351,901 | 11/1967 | Padberg, Jr. | 367/116 |
| 3,604,803 | 9/1971 | Kahn | 356/5.04 |
| 3,903,520 | 9/1975 | Shostak | 342/22 |
| 4,004,212 | 1/1977 | Wortman | 378/86 |
| 4,050,819 | 9/1977 | Lichtman | 356/51 |
| 4,290,043 | 9/1981 | Kaplan | 340/850 |
| 4,866,681 | 9/1989 | Fertig | 356/432 T |
| 4,991,149 | 2/1991 | Maccabee | 367/128 |
| 5,161,125 | 11/1992 | Maccabee | 367/128 |
| 5,316,983 | 5/1994 | Fujimori et al. | 437/250 |

Primary Examiner—Jeffery Hofsass
Assistant Examiner—Benjamin C. Lee
Attorney, Agent, or Firm—James B. Bechtel, Esq.

[57] ABSTRACT

A method and system are provided for detecting objects at or below a surface of a body of water. A focused beam of amplitude varying electromagnetic radiation, e.g., a pulsed laser beam, is directed through the air towards the water's surface. Acoustic energy under the water's surface is monitored for any acoustic return that may be generated in the water as a result of the beam being incident on either an object at the water's surface or the water's surface above an object.

24 Claims, 1 Drawing Sheet

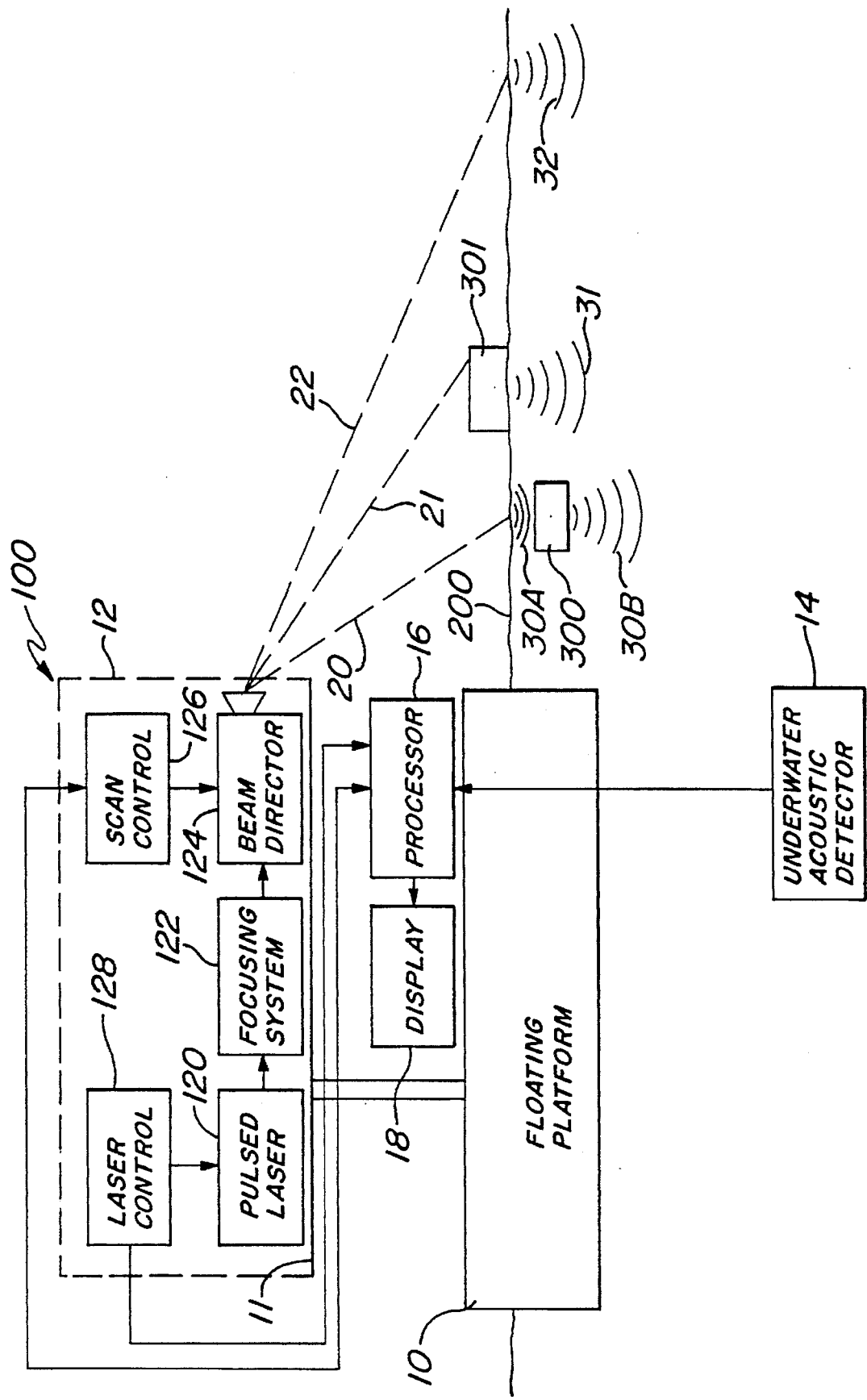

METHOD AND SYSTEM FOR DETECTING OBJECTS AT OR BELOW THE WATER'S SURFACE

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to object locating systems, and more particularly to a method and system of detecting an object at or below the water's surface by using electromagnetic radiation to generate acoustic energy in the water.

BACKGROUND OF THE INVENTION

The avoidance of objects at or just below the water's surface is of interest to pleasure, commercial and military boat/ship operators. The locating/detecting of such objects runs the gamut from on-board human lookouts to complex optical systems operated from airplanes flying above the water's surface. The human system suffers from the obvious drawbacks of inefficiency and error while the complex flyover systems are costly and impractical in most scenarios.

SUMMARY OF THE INVENTION

Accordingly, it is an object of the present invention to provide a method and system for efficiently and accurately detecting/locating objects that are at or just below the water's surface.

Another object of the present invention is to provide a shipboard based method and system for detecting/locating objects at or just below the water's surface.

Other objects and advantages of the present invention will become more obvious hereinafter in the specification and drawings.

In accordance with the present invention, a method and system are provided for detecting objects at or below a surface of a body of water. A high-power beam of amplitude varying electromagnetic radiation, e.g., a pulsed laser beam of megawatt peak power, is focused and directed through the air towards the water's surface. When the focused beam strikes a small area on the surface of an object floating on the water's surface, or when it strikes the water's surface above an object floating below the water's surface, pressure pulses are generated at either the object surface or at the water's surface. The pressure pulses cause characteristic acoustic returns in the water. Accordingly, acoustic energy under the water's surface is monitored for any acoustic return that may be generated in the water as a result of the beam being incident either on an object floating above the water's surface or on the surface of the water above an object. The characteristics of the acoustic returns, e.g., time of occurrence of the acoustic return, duration of the acoustic return, frequency spectrum of the acoustic return, etc., are used to detect and locate the objects and possibly to classify them.

BRIEF DESCRIPTION OF THE DRAWINGS

The sole FIGURE is a schematic representation of an embodiment of the system used to detect objects at or just below the surface of water according to the present invention.

DETAILED DESCRIPTION OF THE INVENTION

Referring now to the sole FIGURE, an embodiment of the system used in the present invention to detect objects at or below the water's surface is shown schematically and is referenced generally by numeral 100. Floating platform 10, e.g., a ship, is equipped with focused beam radiator 12, underwater acoustic detector 14, processor 16 and an output device such as display 18. Briefly, radiator 12 directs a high-power, focused beam of electromagnetic radiation having an amplitude that varies with time. By way of illustrative example, it will be assumed that the radiation is a laser beam of several megawatts peak power radiated in the form of focused pulses represented in the FIGURE by dashed lines 20, 21, and 22. However, it is to be understood that other forms of high-power electromagnetic radiation such as microwave radiation can be used by the present invention. The pulses can be of fixed or varying duration, equally spaced in time or spaced as a time-varying sequence as will be explained further below. In all cases, the electromagnetic radiation output from radiator 12 should be of a frequency or wavelength that is strongly absorbed by water over a very short distance (typically less than a millimeter) in order to maximize the conversion of electromagnetic energy into acoustic energy. For example, electromagnetic radiation in the wavelength bands from 2.5 to 3 microns and from 9 to 11 microns is strongly absorbed by water.

In the illustrative embodiment, radiator 12 includes pulsed laser 120, focusing system 122, beam director 124, laser control 128, and scan control 126. Pulsed laser 120 generates the amplitude varying electromagnetic radiation used in the present invention. As described above, the frequency or wavelength band of laser 120 is chosen to provide the most efficient generation of sound when its beam strikes the dry or wet surface of a floating object or the surface of the water just above a slightly submerged object. Laser control 128 informs processor 16 of the time of occurrence of a pulse output from laser 120. In the event that two or more lasers of different wavelengths are used, laser control 128 provides information to processor 16 as to which wavelength is used.

Focusing system 122 is an optical system that focuses the output beam from pulsed laser 120. In terms of the present invention, focusing is defined as reducing the cross-sectional area of the laser beam as much as possible in order to maximize energy density of the beam at the water surface or at the surface of a floating object. For example, if focusing system 122 were achieved using astigmatic optics, the cross-sectional area of the laser beam could typically be reduced to a few square centimeters.

Beam director 124 directs the focused beam, e.g., beam 20, 21 or 22, through the air and, typically, out in front of platform 10. Accordingly, beam director 124 is generally located above the water's surface which is referenced in the FIGURE by numeral 200. Beam director 124 can be a motorized mirror whose position is controlled by scan control 126 to direct the output of laser 120 at any given time as either beam 20, 21 or 22. Scan control 126 also provides the directed location of each beam to processor 16. Thus, for each beam output from generator 12, processor 16 is informed of the beam's frequency, time of occurrence, duration of pulse and directed location.

In general, the focused beam from beam director 124 impinges on either:

1) surface 200 just above a slightly submerged object such as object 300 as in the case of beam 20, 2) a floating object such as object 301 floating on surface 200 as in the case of beam 21, or 3) surface 200 with no object just below surface 200 as in the case of beam 22.

However, in all cases as will be explained further below, the impingement of the focused beam creates small pressure pulses or explosions at either:

1) surface 200 just above object 300 as in the case of beam 20, 2) object 301 as in the case of beam 21, or 3) surface 200 as in the case of beam 22.

In the case of beam 20, the pressure pulses or explosions occurring at surface 200 propagate through the water as acoustic wave 30A. The distance of propagation could be less than an inch up to many feet depending on the presence or absence of objects beneath surface 200. In this example, wave 30A strikes object 300 thereby producing an acoustic return or echo by direct reflection which is represented in the FIGURE by acoustic return 30B. Further, if the amplitude of acoustic wave 30A is sufficiently great (owing to the energy density of beam 20), wave 30A can also cause object 300 to vibrate in a characteristic manner that contributes to acoustic return 30B. In the case of beam 21, the pressure pulses or explosions occur on the surface of object 301 thereby causing it to mechanically vibrate at some characteristic frequency resulting in acoustic return 31 propagating into the water. In the case of beam 22, the pressure pulses or explosions occurring at surface 200 propagate uninterrupted through the water as acoustic return 32. Each acoustic return can be thought of as an acoustic signal source, the location and/or classification of which can be detected/analyzed by means of a high-sped sonar processing system that includes underwater detector 14, processor 16 and display 18.

Underwater acoustic detector 14 is configured to detect underwater sound such as acoustic returns 30B, 31 and/or 32. Underwater acoustic detector 14 could simply be a single hydrophone or an array of hydrophones located underwater at some distance from the area of surface 200 being illuminated by the beams output from generator 12. Typically, detector 14 would be supported from or towed along with platform 10. In general, detector 14 receives underwater sound and converts same to an electrical signal representation thereof for input to processor 16. In terms of the present invention, detector 14 could be configured to be sensitive to the expected range of sound signatures associated with acoustic returns 30B, 31 and 32.

Processor 16 is programmed to discriminate between the acoustic returns detected by detector 14 to identify the location, and possibly classification, of either object 300 or object 301. Processor 16 can transfer data to some apparatus, e.g., display 18, for viewing the range and direction of object 300 or 301 as is done with conventional sonar or radar. If certain types of objects are of concern, e.g., mines, icebergs, etc., processor 16 could be programmed to specifically look for acoustic returns having signatures indicative of such objects that are expected to be at or just below surface 200. The acoustic return signatures can be analyzed in terms of, for example, time of occurrence and duration relative to the particular beam output from radiator 12 and the frequency spectrum of the acoustic return.

Processor 16 can be configured to employ a variety of signal processing techniques depending on the type of information that is useful to those operating system 100. For example, processor 16 could simply compare the acoustic returns from detector 14 with known acoustic signatures in order to determine when an object has been detected at or just below surface 200. One such typical signal processing technique is based on the fact that, as the radiation beam is scanned over the water surface and impacts upon various spots or areas, most of the acoustic pulses generated by the beam will result from the beam striking the water surface with no object present at or just below the surface. Processor 16 can therefore capture in real-time an arbitrary number, e.g., 50, of the acoustic returns and create in real-time an average of these returns which is to be considered as a "typical" return in the absence of an object at or just below the surface. This can be a running average once processor 16 has captured a sufficient number of returns to establish the typical return. In other words, for the example of a typical return based on 50 returns, the first return captured can be dropped once the fifty-first return is captured. The typical return is then recalculated using the new set of returns. The returns correspond to the beam impacting the water surface at different locations as the beam is scanned. Typically, these locations would lie in a line along the scan direction which might be perpendicular to the direction of motion of platform 10.

The characteristics of a return pulse could be calculated by processor 16 in a variety of ways. By way of illustrative example, one technique will be described. For each return pulse, the peak pulse amplitude, the duration at the half-amplitude points, and the half-width (bandwidth) of its power spectrum could be measured. Processor 16 could average these values for the chosen number of returns, e.g., 50 in the current example, to determine "typical" values. Processor 16 could also calculate a numerical value for the statistical deviations about the average amplitude, average duration and average bandwidth. Processor 16 would make the same types of measurements/calculations for each new return. The new values would be compared with the previously calculated typical values to determine whether or not the new values lay within the statistical range of peak amplitude, pulse width and bandwidth that had been determined for the previously determined chosen number of pulses. The new return would differ substantially from the typical value if there were an object present at or below (within several centimeters of) the water surface. At this point, processor 16 could direct scan control 126/beam director 124 to scan the beam on either side of the location on the surface where the difference was detected. Pulses/returns at these side locations would then be created/measured for comparison. This procedure could be repeated several times to see if the difference persists. Processor 16 could then use the vertical and horizontal angles that determine the direction of the beam to determine the location of the difference and pass same on to display 18. Note that these angles are consistently monitored by the beam scanning system.

The above discussion applies to objects which are at the water surface or within some small distance, e.g., 10 centimeters, of the surface. However, the present invention could also be used to detect objects at greater depths, e.g., meters to tens of meters below the surface. A bistatic sonar system is created by the combination of the sound generated at the surface by the radiation beam and the remote location of detector 14 relative to the sound generation. In this case, detector 14 would receive a sound pulse, called the direct pulse, after the time needed for the straight-line transmission of sound from the point of impact of the beam to detector 14. If there were an object at some depth, detector 14 would also receive, at some time after receipt of the direct pulse, the reflection of sound or echo from the object. As an example of this, consider the typical sound speed in water to be about 1500 meters per second. Further assume that the radiation beam impinged on the water at a distance of 100 meters from platform 10, detector 14 is at a depth of 10 meters, and an acoustically reflective object is at a depth of 10 meters below the impact point of the radiation on the surface such that it receives the direct pulse. It would thus require about 0.0067 seconds for the direct pulse to reach the object at 10 meters and 0.067 seconds for the direct pulse to reach detector 14. The echo reflection from the object reaches detector 14 about 0.067 seconds after reflection from the object. Hence, the echo arrives at detector 14 about 0.0067 seconds after the direct pulse. Similar calculations could be done to predict the times of receipt of echoes from object at other depths and for other beam/water impact distances and other detector depths.

Processor 16 could also be configured for further analysis of the acoustic returns in order to distinguish one type of object from another type of object. For instance, processor 16 might need to distinguish the echo from an object of interest from the echoes caused by ambient reflectors such as fish and from ambient background acoustic noise. In this case, processor 16 could compile a running catalogue of pulse shapes from ambient reflectors and also a running catalogue of any ambient noises that might resemble the radiation induced acoustic pulse. Processor 16 could also be configured for further analysis of the acoustic returns in order to classify the type of object detected. Thus, processor 16 could include a memory bank of experimentally or theoretically generated acoustic signatures. Processor 16 might also be part of a trained system if it were implemented as a neural network.

In a typical operation scenario, beam director 124 directs the pulsed and focused laser beam towards one location on surface 200 before being steered to another location. At each such selected location, a burst of pulses from laser 120 can be generated as required to determine the presence or absence of an object at or below the surface at that location. For example, the pulse burst produced by laser 120 could be a series of fixed duration pulses equally spaced in time in order to generate a specific type of acoustic return, e.g., mechanical resonance of an object. The spacing between each pulse burst is selected to be long enough to allow any type of acoustic return of interest to reach detector 14. The pulse bursts produced by laser 120 might also consist of a fixed number of pulses of varying frequency, i.e., a chirped series, with a continually changing time spacing between pulses. This type of radiation will excite more than one mechanical resonance in an object. Each such mechanical resonance causes vibration of the object which, in turn, causes an acoustic return of a particular frequency or set of frequencies in the water. If the chirped pulse excites several frequencies of vibration, then these frequencies constitute a characteristic acoustic spectrum of the object. Such a chirped series is appropriate for the more complex operational scenarios of system 100 which may need to characterize the type of object in addition to the detection/location of the object.

In all cases, it is critical that the focused beam output from radiator 12 vary in amplitude. The present invention utilizes the fact that any amplitude varying electromagnetic radiation, e.g., pulsed laser, accelerates the rate of expansion of a thin layer of the impinged surface. For example, when the radiation impinges on the water's surface, the radiation penetrates some distance into the water depending on the energy density of the radiation and the absorption rate of the water for the particular radiation frequency or wavelength. The absorption of the radiation increases the temperature of the water (at the point of impingement) thereby causing a volume expansion. Depending on the power of the radiation, the absorption can also result in evaporation and explosive ejection of material from the surface of the water. The creation of such a volume expansion or evaporation and ejection of material causes an acoustic pressure wave to emanate from the surface of the water. If the radiation impinges directly on an object, absorption of the radiation can cause a pressure wave due to volume expansion or due to ejection of material from the surface of the object. This pressure wave can cause the object to vibrate characteristically which results in a particular acoustic return being propagated into the water. If the acoustic pressure wave is created at the water's surface, the wave travels downward from the surface. If the wave strikes an object under the water's surface before dissipating, the object will reflect the wave characteristically and/or vibrate characteristically to generate a characteristic acoustic return. Thus, by analyzing the acoustic returns relative to the input radiation, the detection, location and, possibly, classification of an object at or just below the water's surface is possible with the present invention.

By way of a more detailed example, system 100 might be implemented as follows. Laser 120 could be a pulsed carbon dioxide laser capable of delivering 1 to 10 joule pulses at a frequency from 1 to 1000 Hz. Laser control 128 operates pulsed laser 120 at a chosen rate and sends signals to processor 16 indicating each time the laser is fired. To accommodate instability generally associated with a floating platform, focusing system 122 and beam director 124 could be an inertially stabilized beam focusing and steering system in the form of a telescope with a rotatable output mirror. Scan control 126 scans the beam and provides electronic signals to processor 16 which indicate the direction of the beam at any time.

As mentioned above, laser 120, focusing system 122 and beam director 124 would typically be positioned on elevated platform 11 at a height above surface 200. The height of platform 11 should be sufficient to allow the beam output from beam director 124 to be projected an appropriate horizontal distance away from floating platform 10. For example, if floating platform 10 were a ship, a suitable horizontal distance might be 200 feet or more and generally in front of the ship's direction of travel. Further, if the size of objects of interest were 2 feet in width or greater and the width of the surface to be examined were 200 feet, beam director 124 could be controlled by scan control 126 to scan the beam across the water's surface at equi-spaced intervals of 1 foot. That is, immediately after a location is illuminated by a burst of laser pulses, beam director 124 is controlled to move the beam to a next location 1 foot away. This insures more than one impingement of the radiation on any object of interest. (If an object were detected at or just below the water's surface at a particular location, that location could be probed in greater detail using some of the methods described above.) The choice of number of pulses per location as well as pulse rate are generally determined by the amount of redundancy desired at each location and the speed of floating platform.

Underwater acoustic detector 14 could be a sensitive hydrophone or hydrophone array deployed under surface 200. Detector 14 would generally have a broad bandwidth, e.g., up to 100 kHz, for sensitivity to a wide variety of acoustic returns. The output of detector 14 serves as an input to processor 16.

The advantages of the present invention are numerous. The method is easily implemented as a shipboard system that can be configured simply and inexpensively for specific detection applications. Further, the method can be extended to more complex operational scenarios where it is critical to detect and classify an object at or just below the surface of the water.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method for detecting an object below a surface of a body of water, comprising the steps of:

radiating a beam of amplitude varying electromagnetic radiation through the air towards said surface, said electromagnetic radiation being of a wavelength absorbed by the water near said surface wherein said beam is converted from said electromagnetic radiation into acoustic energy; and monitoring, from under said surface, said acoustic energy and an acoustic return generated in the water as a result of said acoustic energy being reflected from an object beneath said surface, wherein the presence of said acoustic return is indicative of the presence of said object and wherein differences between said acoustic energy and said acoustic return are used to characterize said object.

2. A method according to claim 1 wherein said beam of amplitude varying electromagnetic radiation comprises pulses of varying duration.

3. A method according to claim 1 wherein said beam of amplitude varying electromagnetic radiation comprises a time varying series of pulses.

4. A method according to claim 1 wherein said beam of amplitude varying electromagnetic radiation comprises a chirped series of pulses.

5. A method according to claim 1 wherein a wavelength of said electromagnetic radiation is selected from the group of wavelength bands consisting of a wavelength band from 2.5 to 3 microns and a wavelength band from 9 to 11 microns.

6. A method according to claim 1 wherein said beam of amplitude varying electromagnetic radiation comprises pulses of fixed duration.

7. A method according to claim 6 wherein said pulses are equi-spaced in time.

8. A method according to claim 1 further comprising the step of scanning said beam across said surface.

9. A method according to claim 8 wherein said step of scanning comprises the step of repeatedly performing said step of radiating for a plurality of spaced apart locations on said surface.

10. A method according to claim 9 wherein said plurality of spaced apart locations are equi-spaced.

11. A method for detecting an object below a surface of a body of water, comprising the steps of:

pulsing a laser beam to create a pulsed laser beam;

focusing said laser beam to create a focused pulsed laser beam;

directing said focused pulsed laser beam through the air towards said surface such that, if uninterrupted by an object, said focused pulsed laser beam is incident on said surface, said focused pulsed laser beam being of a wavelength absorbed by the water near said surface wherein said focused pulsed laser beam is converted into acoustic energy;

monitoring, from under said surface, said acoustic energy and an acoustic return generated in the water as a result of said acoustic energy being reflected from an object beneath said surface; and analyzing said acoustic energy and characteristics of said acoustic return, said characteristics of said acoustic return including time of occurrence of said acoustic return, amplitude of said acoustic return, duration of said acoustic return, and frequency spectrum of said acoustic return, wherein the presence of said acoustic return is indicative of the presence of said object and differences between said acoustic energy and said characteristics of said acoustic return are used to characterize said object.

12. A method according to claim 11 wherein said pulsed laser beam comprises pulses of varying duration.

13. A method according to claim 11 wherein said pulsed laser beam comprises a time varying series of pulses.

14. A method according to claim 11 wherein said pulsed laser beam comprises a chirped series of pulses.

15. A method according to claim 11 wherein a wavelength of said pulsed laser beam is selected from the group of wavelength bands consisting of a wavelength band from 2.5 to 3 microns and a wavelength band from 9 to 11 microns.

16. A method according to claim 11 wherein said pulsed laser beam comprises pulses of fixed duration.

17. A method according to claim 16 wherein said pulses are equi-spaced in time.

18. A method according to claim 11 further comprising the step of scanning said focused pulsed laser beam across said surface.

19. A method according to claim 18 wherein said step of scanning comprises the step of repeatedly performing said step of directing for a plurality of spaced apart locations on said surface.

20. A method according to claim 19 wherein said plurality of spaced apart locations are equi-spaced.

21. A system for detecting an object below a surface of a body of water comprising:

a focused beam generator for directing a focused beam of amplitude varying electromagnetic radiation through the air towards said surface such that, if uninterrupted by an object, said focused beam is incident on said surface, said electromagnetic radiation being of a wavelength absorbed by the water near said surface wherein said beam is converted from said electromagnetic radiation into acoustic energy;

an underwater acoustic detection system for monitoring said acoustic energy and an acoustic return generated in the water as a result of said acoustic energy being reflected from an object beneath said surface; and a processor coupled to said focused beam generator and said underwater acoustic detection system for analyzing said acoustic energy and characteristics of said acoustic return, said characteristics of said acoustic return including time of occurrence of said acoustic return, duration of said acoustic return, and frequency spectrum of said acoustic return, wherein the presence of said acoustic return is indicative of the presence of said object and differences between said acoustic energy and said characteristics of said acoustic return are used to characterize said object.

22. A system as in claim 21 further comprising means for scanning said focused beam across said surface.

23. A system as in claim 21 further comprising a floating platform for maintaining said focused beam generator above said surface.

24. A system as in claim 23 wherein said electromagnetic radiation is pulsed laser radiation.

* * * * *